United States Patent

[11] 3,602,894

[72] Inventors John J. Igel
Rochester;
Myron D. Schettl, Oronoco, both of, Minn.
[21] Appl. No. 835,548
[22] Filed June 23, 1969
[45] Patented Aug. 31, 1971
[73] Assignee International Business Machines Corporation
Armonk, N.Y.

[54] PROGRAM CHANGE CONTROL SYSTEM
10 Claims, 5 Drawing Figs.

[52] U.S. Cl. .......... 340/172.5
[51] Int. Cl. .......... G06f 9/00, G06f 9/06
[50] Field of Search .......... 340/172.5, 365; 235/157, 61.1, 145

[56] References Cited
UNITED STATES PATENTS

| | | | |
|---|---|---|---|
| 2,964,743 | 12/1960 | Bange .......... | 340/365 |
| 2,991,453 | 7/1961 | Leonard .......... | 340/172.5 |
| 3,023,952 | 3/1962 | Thomas .......... | 235/61.1 |
| 3,158,317 | 11/1964 | Alexander .......... | 235/145 |
| 3,187,321 | 6/1965 | Kameny .......... | 340/172.5 |
| 3,273,792 | 9/1966 | Smith .......... | 234/18 |
| 3,341,819 | 9/1967 | Emerson .......... | 340/172.5 |
| 3,380,033 | 4/1968 | Cerny .......... | 340/172.5 |
| 3,487,369 | 12/1969 | King et al. .......... | 340/172.5 |

*Primary Examiner*—Gareth D. Shaw
*Attorneys*—Hanifin and Jancin and Keith T. Bleuer

ABSTRACT: A key-entry system having a plurality of programs selectable by different program keys provided with over-control mechanism operative to allow a change in program only in the first column of a field or prior to the first column and allowing a program change request by depression of a program key to be stored until the last column of a field presently being keyed has been entered.

INVENTORS
JOHN J. IGEL
MYRON D. SCHETTL
BY
Keith T. Bleuer
ATTORNEY

PROGRAM CHANGE CONTROL SYSTEM

BACKGROUND OF THE INVENTION

The invention relates to key-operated data entry systems and more particularly to such systems that are under the control of different programs effective for controlling key entry into storage.

It has been previously proposed, in connection with a punch for document cards, to provide mechanism for punching the cards under control of a plurality of different programs, with a change from one program to another being under the control of a manually operated program key for each of the programs. The change from one program was made immediately upon actuation of the key pertaining to the new program.

SUMMARY OF THE INVENTION

It is an object of the present invention to provide a program change control system for a key-operated machine providing data into storage corresponding to the data keys operated with the program change control system allowing a second program to be selected while a first program is in effect. The actual change from the first program to the second program, however, is made only during the first column of a new field or upon completion of the last column of the preceding field being keyed.

Preferably, each of the programs is selected by depression of a program key; and the effect of actuation of each of these keys is to set a program key latch. The program key latch is connected with control circuitry so that the program key latch is not effective to actually change the program unless the system is in the first column of a field or an entry of data has been made in the last column of a field. In the case in which a second program key is depressed while the machine is operating in the middle of a field programmed by previous actuation of a first program key, the corresponding program key latch stores the request for a change in program made by depression of the second program key.

DESCRIPTION OF THE PREFERRED EMBODIMENT

Figure 1A:
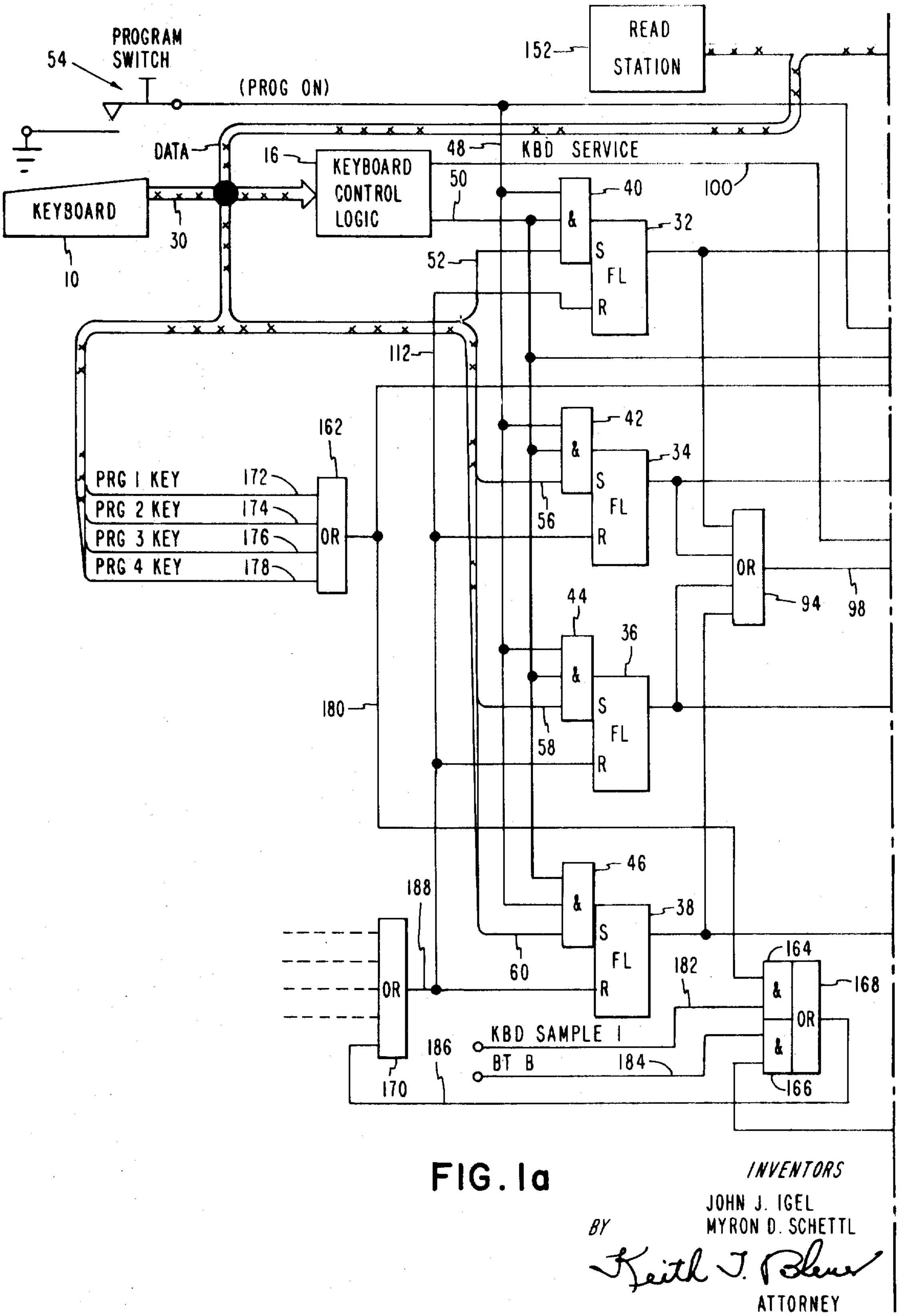
FIGS. 1*a* and 1*b* when placed together, with FIG. 1*a* on the left and FIG. 1*b* on the right, form a diagrammatic illustration of a program controlled data entry system incorporating the principles of the invention.
Figure 1B:
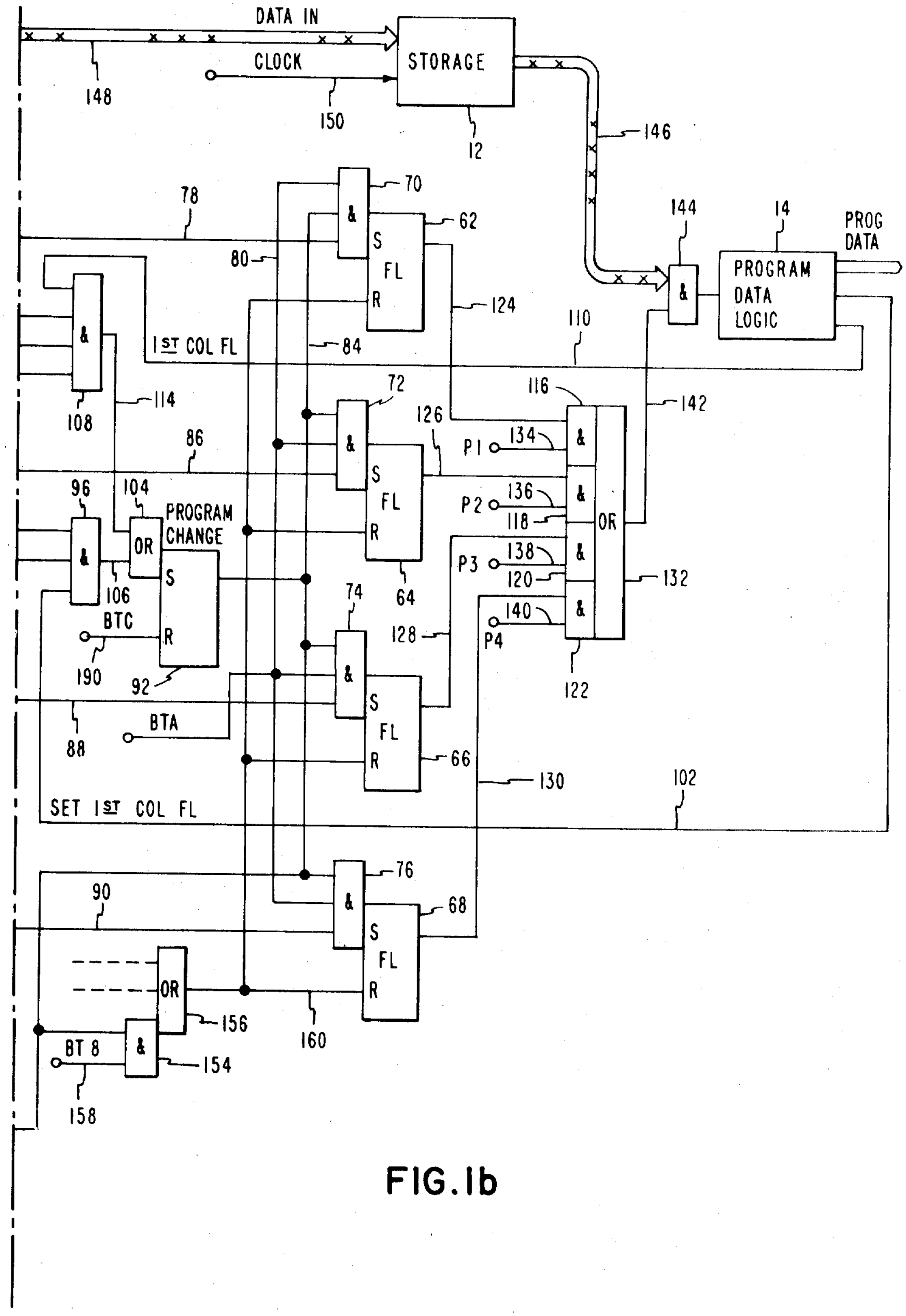

Referring now to FIGS. 1*a* and 1*b* of the drawings, the illustrated program controlled data entry system, which may, for example, be included in a keypunch for perforating document cards, comprises in general a keyboard 10, a data storage unit 12, program data logic 14, keyboard control logic 16, and in addition various logic circuits such as logical AND and OR circuits and flip latches connected together and to be hereinafter described whereby the various programs of operation may be changed, but only at certain times and under certain conditions as determined by the program data logic 14.

Figure 3:
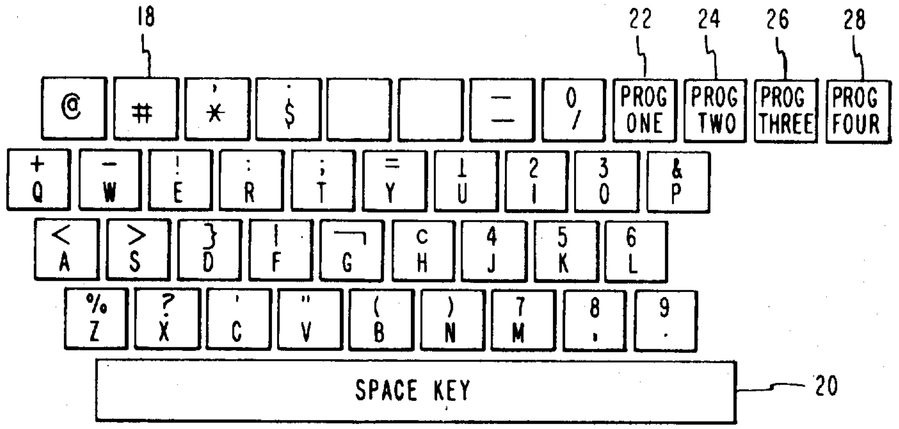
FIG. 3 is a top view of a keyboard used in connection with the system in FIGS. 1*a* and 1*b*.

Referring to FIG. 3, the keyboard 10 comprises a plurality of data keys 18, a space key or bar 20, and function keys which are a program (1) key 22, a program (2) key 24, a program (3) key 26, and a program (4) key 28. The keyboard 10 includes encoding logic therein for producing various signals on output buss 30 when these keys are actuated.

The keyboard control logic 16 is connected with the keyboard 10 by the buss 30, and various other signals generated by operation of the keyboard 10 are thus applied onto the keyboard control logic 16 as will be hereinafter described in greater detail. The system includes four program key flip latches 32, 34, 36, and 38. Logical AND circuits 40, 42, 44, and 46 are provided on the set sides of each of the latches 32, 34, 36, and 38, respectively. The AND circuit 40 has three inputs, namely, from leads 48, 50, and 52. The lead 48 is connected with a manually operated program switch 54, and the input from the lead 48 is provided when the switch 54 is closed. The lead 50 is connected with the keyboard control logic 16, and the logic 16 is of such construction that it provides a "keyboard sample 2" signal on the lead 50 when any of the keys 18 or the space bar 20 is depressed, as will be hereinafter more fully described. The lead 52 is connected with the buss 30 and thereby with the keyboard 10 so that a signal is applied on the lead 52 when program (1) key 22 is depressed.

The inputs to the AND circuit 42 include the leads 48 and 50 as just described in connection with AND circuit 40 and include also a lead 56 which is connected through the buss 30 to the keyboard 10 so that it has a signal applied to it when the program (2) key 24 is depressed.

AND circuits 44 and 46 each have input connections similar to those for the AND circuits 40 and 42, namely, by means of the leads 48 and 50; however, one of the inputs to the AND circuit 44 is by means of a lead 58, and one of the inputs to the AND circuit 46 is by means of a lead 60 which are respectively provided with signals when the program (3) key 26 and the program (4) key 28 are depressed.

The system includes program level flip latches 62, 64, 66, and 68. The latches 62, 64, 66, and 68 are respectively provided with logical AND circuits 70, 72, 74, and 76 on their set sides; and each of these AND circuits has three inputs.

One of the inputs to the AND circuit 70 is by means of a lead 78 connected with the program key latch 32 and supplied with a signal from the latch 32 when latch 32 is set. Another of the inputs to the AND circuit 70 is by means of a lead 80 which is supplied with a timed signal, bit A, from a clock 82, which is shown in FIG. 3 and which will be hereinafter more fully described. The third input to the AND circuit 70 is from a lead 84 to which a signal is supplied when a program change is to be made, as will be described.

One of the inputs to the circuit 72 is from the flip latch 34 through a lead 86; and the other two inputs to the AND circuit 72 are from the leads 80 and 84, also connected to the AND circuit 70. The AND circuits 74 and 76 also have inputs by means of leads 80 and 84, and their third inputs respectively are from leads 88 and 90 connected with the latches 36 and 38.

A signal is supplied to the lead 84 from a program change latch 92 so as to thereby designate a program change. The latch 92 is controlled from logical OR circuit 94 and logical AND circuit 96. The OR circuit 94 has four inputs provided respectively by leads 78, 86, 88, and 90. The AND circuit 96 has three inputs, one of which is from a lead 98 connected with the OR circuit 94, a second of which is from a lead 100 connected with the keyboard control logic 16, and the third of which is from a lead 102 connected with the program data logic 14. The keyboard control logic 16 is of such construction that it supplies a "keyboard service" signal on the lead 100 whenever any of the data keys 18 or the space key 20 is depressed. The program data logic 14 provides a signal "set first column latch" on the lead 102 under conditions which will be subsequently described.

A logical OR circuit 104 is provided on the set side of the latch 92, and the logical OR circuit 104 has an input from a lead 106 connected with the AND circuit 96.

Under certain conditions, the AND circuit 96 controls the setting of the program change latch 92; and another logical AND circuit 108 is provided also for controlling the setting of latch 92 under other conditions. The AND circuit 108 has four inputs one of which is from a lead 110 connected with the program data logic 14. The lead 110 has a signal "first column latch" applied to it from the logic 14 as will be hereinafter described. A second input to the AND circuit 108 is from the lead 48 connected with the program switch 54; a third input to the AND circuit 108 is from lead 50; and the fourth input to the AND circuit 108 is from a lead 112. The AND circuit 108 has its output connected by means of a lead 114 with the OR circuit 104.

The program level latches 62, 64, 66, and 68 are respectively connected with AND circuits 116, 118, 120, and 122 by leads 124, 126, 128, and 130. All of the AND circuits 116, 118, 120, and 122 are connected to a logical OR CIRCUIT 132. Each of the AND circuits 116, 118, 120, and 122 has two inputs; and the other input to the AND circuit 116 is from lead 134 which has a signal "P1" from clock 82 applied to it. The other inputs to the AND circuits 118, 120, and 122 are respectively from leads 136, 138, and 140 which have clock signals "P2," "P3," and "P4" applied on them.

The OR circuit 132 has its output connected by means of a lead 142 with a logical AND circuit 144. The AND circuit 144 has two inputs, and the other input to the AND circuit 144 is from storage 12 by means of a buss 146.

Storage 12 has two inputs one of which is by means of a buss 148 connected with the keyboard 10 so that data is supplied to storage 12 whenever one of the data keys 18 or the space bar 20 is depressed and the other one of which is from the clock 82 by means of a lead 150. A read station 152 may also be connected to the buss 148 for supplying data to storage 12.

The program level latches 62, 64, 66, and 68 may be reset by means of a logical AND circuit 154 which is applied onto a logical OR circuit 156. The AND circuit 154 has two inputs one of which constitutes the lead 84, and the other input to the AND circuit 154 is a lead 158, which has a "bit 8" signal applied onto it from the clock 82. This signal will be hereinafter more fully described in connection with the other outputs of the clock 82. The OR circuit 156 is connected by means of a lead 160 with the reset sides of the latches 62, 64, 66, and 68.

Resetting of the program key latches 32, 34, 36, and 38 is under the control of a logical OR circuit 162, logical AND circuits 164 and 166, and logical OR circuits 168 and 170. The OR circuit 162 has four inputs from leads 172, 174, 176, and 178 which are connected with the buss 30 in such a manner that a signal is supplied to the leads 172, 174, 176, and 178 respectively when the program keys 22, 24, 26, and 28 are depressed. The OR circuit 162 has its output on a lead 180 which thus has a signal on it when any one of the program keys 22, 24, 26, and 28 is depressed. The lead 112 is connected with the output of the OR circuit 162 and the lead 180, and lead 180 is connected with the AND circuit 164 so as to constitute one input to the AND circuit 164. The AND circuit 164 has two inputs, and the other input is from a lead 182 which has a signal "keyboard sample 1" applied to it which is similar to the "keyboard sample 2" signal in lead 50 but differs in timing from that of "keyboard sample 2" as will be hereinafter described. The AND circuit 166 has two inputs, one of which is the lead 84 and the other of which is a lead 184. The lead 184 has a bit B from clock 82 applied to it which is timed with respect to the other bits from the clock 82 as will be hereinafter described. The AND circuits 164 and 166 are applied onto the OR circuit 168, and the output of the OR circuit 168 is by means of a lead 186 which constitutes an input to OR circuit 170. The OR circuit 170 may have other inputs if desired; and the output of the OR circuit 170 constitutes a lead 188 which is connected to the reset sides of all of the program key latches 32, 34, 36, and 38. The program change latch 92 is reset by means of a signal at bit time C from clock 82 applied on lead 190.

Figure 2:
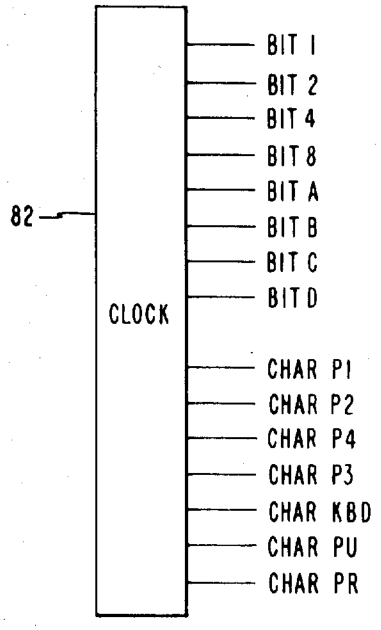
FIG. 2 is a diagrammatic view of a clock used with the system shown in FIGS. 1*a* and 1*b*.

Referring to FIG 2, the clock 82 may be of any suitable type and provides bit times 1, 2, 4, 8, A, B, C, and D which follow each other in this order in each of seven character times, which may be termed P1, P2, P4, P3, KBD, PU, and PR and which follow each other in this order. Each of the bit times may have a duration of 1 microsecond, for example; and a character time including the eight bit times may be eight times as long and may be 8 microseconds in duration. As has been previously described, signals at bit times 8, A, B, and C are respectively applied on leads 158, 80, 184, and 190.

The "keyboard sample 1" pulse is a pulse that is generated from both the clock 82 and the keyboard 10 and occurs for a bit time of 1 microsecond at bit time 2 when one of the keys 18, 20, 22, 24, 26, and 28 of the keyboard is depressed. The "keyboard sample 2" signal is the same type of signal but occurs at bit time 4 following the "keyboard sample 1" pulse.

Figure 4:
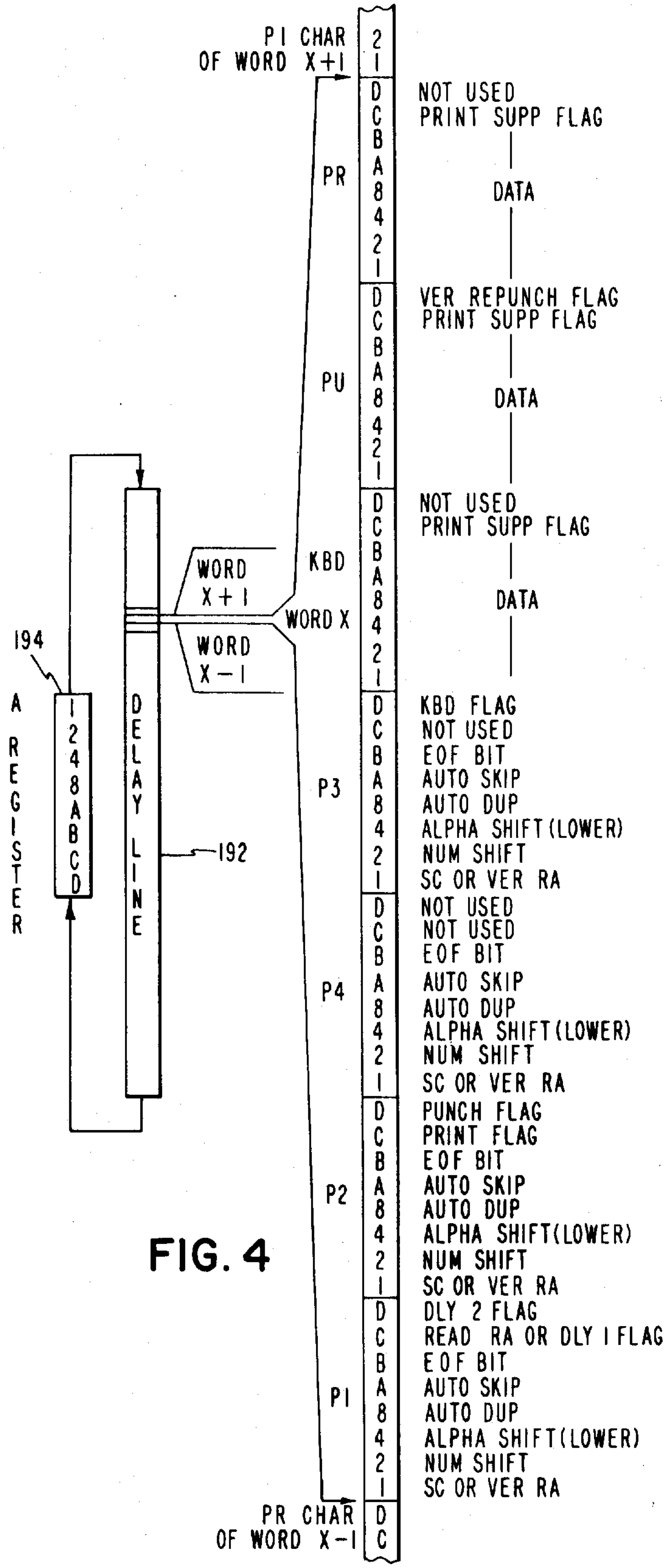
FIG. 4 is a diagram showing data circulating in the storage unit of the system.

When any of the data keys 18 on the keyboard 10 is struck, a signal is thereby generated by the keyboard and is transmitted through busses 30 and 148 to storage 12. The data from a key depression may, for example, be eight bits long; and the bits are transmitted to storage 12 and are stored therein. The storage 12 may, for example, include an electroacoustic delay line 192 (see FIG. 4), data circulation through which is maintained under the control of clock 82 connected thereto by means of lead 150. An A Register 194, which is a shift register, is provided in the same circuit as the delay line 192, as shown in FIG. 4. The data from the read station 152 may likewise be transmitted through buss 148 to storage 12; and this data, so read, may include program data, such as, if for a keypunch, data provided for a skip of columns to be keyed, a duplication of columns of data, programmed numeric shift in which only the numeric ones of the data keys 18 are effective, programmed lower shift in which only the lower characters in each of the data keys 18 are effective, and the end of a field. A field is a group of characters in a complete record; and a record, for example, may consist of 96 groups of characters to correspond, for example, to a document card having 96 columns. The data within storage 12 is available on the buss 146 constituting the output of storage 12.

The circulation of data within the delay line 192 of storage 12 may, for example, be in the form as illustrated in FIG. 4. There may, for example, be 96 words circulating in serial fashion through the delay line; and each of these words includes characters PR, PU, KBD, P3, P4, P2, and P1. As indicated in the figure, bits 1, 2, 4, 8, A, and B in the KBD, PU, and PR characters are reserved for data derived from the data keys 18. The P3, P4, P2, and P1 characters contain the program data; and the B bit in each of characters P3, P4, P2, and P1 is an end of field bit which indicates that the word under consideration constitutes an end of field when the particular program P3, P4, P2, and P1 is in control. The word illustrated in FIG. 4 is shown as being in a predetermined position in the delay line 192 constituting a part of storage 12; and the data circulates through the delay line 192 and through the A register 194. During the circulation of the words and characters within the delay line 192, the bit times of each character pass a predetermined point in the delay line in each bit time; and, since the characters include the eight bits 1, 2, 4, 8, A, B, C, and D, the time required for a character to pass a particular point in the delay line 192 is eight times as long as that required for a particular bit to pass the point.

The program data logic 14 may constitute a series of latches that involve the various functions performed within the machine such as the functions skip, dup, programmed numeric shift, alpha or lower shift, and end of field. These functions, it will be noted, are or may be contained in each of the various program areas P3, P4, P2, and P1 in each of the 96 words of data circulating within the delay line 192; and bits may be entered into the various program areas P3, P4, P2, and P1 for these particular functions by any suitable means, such as, for example, by utilizing the read station 152. Program data from the program data logic 14 may be transmitted on to additional latches, circuitry, and mechanical devices (not shown) for rendering operative the particular program which is in effect at any particular time.

In addition to the "keyboard sample 1" and "keyboard sample 2" signals, which are pulses at bit times 2 and 4 as has been explained, a data key 18 or the space key 20, upon depression, generates the signal "keyboard service" in lead 100. The signal "first column latch" in lead 110 is generated by the program data logic 14, and this is a signal indicating that the machine is in the first column of a field which is defined by the end of field characters in the program then in effect and contained in storage 12. The signal "set first column latch" in lead 102 is also generated by the program data logic 14, and this signal also refers to the first column of a field; but this signal is a pulse as distinguished from the considerably longer signal "-first column latch" and exists at a time prior to that of the "-first column latch" signal in lead 110 and while the system is moving from the last column of a field into the first column of the next field.

The program control system of the invention effectively causes an immediate program change on depression of one of the program keys 22, 24, 26, and 28 when the machine is physically in the first column of a field. Alternately, if one of the program keys 22, 24, 26, and 28 is depressed at a time when the machine is within a field, prior to the end of a field, the system stores the directions for the change until the last column of the field is entered and just prior to the first column of the next field; and, at this time, the change is made.

The AND circuit 108 is effective in connection with the circuitry connected thereto and particularly in connection with the program change latch 92 to cause an immediate change of program during the first column of a field; and the AND circuit 96, which is also connected with the program change latch 92 through the OR circuit 104, is effective for providing the deferred change of program status if one of the program keys 22, 24, 26, and 28 is depressed before the field has ended.

Assuming that the machine is in the first column of a field, the signal "first column latch" exists in lead 110. It is assumed that the manually operated program switch 54 is closed, and thus a signal exists in lead 48 applied to AND circuit 108. The depression of one of the program keys 22, 24, 26, and 28 provides a "keyboard sample 2" signal in lead 50; and this signal is also applied onto the AND circuit 108. Depression of one of the program keys 22, 24, 26, and 28 also supplies a signal through lead 180 on the AND circuit 108; and thus all four inputs to the AND circuit 108 have signals supplied to them. The AND circuit 108 thus supplies a signal to OR circuit 104 through lead 114, and the latch 92 is set so as to provide a signal on lead 84.

Assuming that is is the program (1) key 22 that has been depressed, a signal is supplied from the buss 30 through lead 52 onto the AND circuit 40. The "keyboard sample 2" pulse is effective through lead 50 also on AND circuit 40, and the third input to the AND circuit 40 is supplied from the program switch 54 through lead 48. Therefore, AND circuit 40 has all of its inputs satisfied so as to set the program key latch 32; and a signal is thus provided on lead 78 effective on the AND circuit 70. A signal exists in lead 84 from program change latch 92 as previously described; and at bit time A, a signal exists on lead 80 so that all three inputs of AND circuit 70 are satisfied to thus set the program level latch 62.

The latch 62 provides a signal on lead 124, and this signal is applied onto the AND circuit 116. The two inputs to the AND circuit 116 are satisfied at P1 time of the clock 82, and a signal is therefore transmitted from the OR circuit 132 through lead 142 at P1 time to the AND circuit 144. At p1 time, the output of storage 12 for program (1) is effective on lead 146; and, therefore, the AND circuit 144 is satisfied at this time and transmits data for program (1) from the AND circuit 144 to the program data logic 14.

The effect of the P1 character signal on lead 134 and therefore the signal on lead 142 at P1 time of the clock 82 is thus to cause the AND circuit 144 to gate the first program data contained in storage 12 to the program data logic 14 so as to load the program data latches contained in logic 14. The AND circuit 144 compares the output of the OR circuit 132 at P1 time with the output from storage 12 in lead 146 at the same time so as to gate the data effective on the lead 146 at this time to the program data logic 14, this being the P1 data contained in storage 12.

Assuming that any of the other program keys 24, 26, and 28 are depressed subsequent to or in lieu of program key 22, the program key latches 34, 36, and 38 cooperate with the program level latches 64, 66, and 68 in the same manner as the program key latch 32 cooperates with the program level latch 62 as just described. The effect of depressing the program keys 24, 26, and 28 is to respectively satisfy the AND circuits 118, 120, and 122 at P2, P3, and P4 clock times so that the contents of programs 2, 3, and 4 are respectively gated by AND circuit 144 to the program data logic 14. This operation, with respect to the program keys 24, 26, and 28, also is under the control of the AND circuit 108 and the program change latch 92 as has been described in connection with a depression of program (1) key 22.

Assuming that the program (1) key 22 was depressed in the middle of a field as defined by the program then in effect, the "first column latch" signal in lead 110 does not exist; and, therefore, the AND circuit 108 cannot be satisfied in order to cause a setting of the program change latch 92. Therefore, no change in program can take place at this time due to the AND circuit 108. The latch 32 functions in this case to store the request for program (1), assuming that one of the other program keys has been effective; and the AND circuit 96 subsequently functions to put this request into effect. The depression of program (1) key 22, in this case, sets the program key latch 32 in the same manner as depression of the program (1) key 22 in the former case; however, the corresponding program level latch 62 is not set at this time since the AND circuit 70 is not satisfied due to a lack of signal on the lead 84 from the program change latch 92.

The signal in the lead 78 from the latch 32, which is now set, is supplied to the OR circuit 94 that, in turn, supplies a signal onto the AND circuit 96 through lead 98. The signal "set first column latch" in lead 102 does not exist until the last entry in a field has taken place due to depression of a data key 18 for entering the last data character in the field then being keyed; and at this time, just before entering into the first column of the succeeding field, the signal "set first column latch" in lead 102 appears. On depression of the last data key 18 in the field, the signal "keyboard service" appears in lead 100 due to the depression of this data key 18; and, at this time, the three inputs to the AND circuit 96 are satisfied. A signal then appears on lead 106 applied to OR circuit 104 setting the program change latch 92 and providing a signal in lead 84. At bit time A, a signal is applied onto the lead 80; and the AND circuit 70 has all three of its inputs satisfied. The latch 62 is then set providing a signal on lead 124 so that the AND circuit 116 has all of its inputs satisfied at clock time P1 as before. A compare is made by the AND circuit 144 at P1 time so as to transfer the data of program (1) from storage 12 to the program data logic 14 at this time in the same manner as if the change occurred under the control of the AND circuit 108 when the machine was actually in the first column of a field.

The AND circuit 96 is effective to cause a change in program after one of the other program keys 24, 26, and 28 has been depressed, just before entry into the first column of a succeeding field, in the same manner as in connection with the program (1) key 22. For these cases, however, the program key latches 34, 36, and 38, and the program level latches 64, 66, and 68, are effective in lieu of the latches 32 and 62.

The AND circuit 164 provides for resetting the program key latches 32, 34, 36, and 38, assuming that one of the program keys 22, 24, 26, and 28 has been depressed by mistake in the middle of a field and it was intended by the machine operator to instead depress one of the other program keys. In this case, on depression of the correct program key, one of the leads 172, 174, 176, and 178 has a signal provided to it which passes through the OR circuit 162 and the lead 180 to one of the inputs of the AND circuit 164. At keyboard sample 1 time, which is bit time 2 from the clock 82, the AND circuit 164 has both inputs satisfied so as to transmit a signal from OR circuit 168 through lead 186, OR circuit 170, and lead 188 to the reset sides of the four program key latches 32, 34, 36, and 38 thus resetting these latches. Subsequently, the correct latch 32, 34, 36, and 38 is set, since setting of these latches takes place at keyboard sample 2 time (bit time 4 from clock 82) from a signal in lead 50.

The purpose of the AND circuit 154 having a signal at bit time 8 applied thereto is to cause a resetting of the program level latches 62, 64, 66, and 68 at this time and after the program change latch 92 has been set; so that subsequently, at bit time A, the proper one of these latches may be set. The resetting signal for the latches 62, 64, 66, and 68 is provided from AND circuit 154 which has its two inputs satisfied at bit time 8 and from lead 84 when program change latch 92 is set. The AND circuit 154 supplies a signal through OR circuit 156 to lead 160 for this purpose.

After the program change latch 92 has been set, the program key latches 32, 34, 36 and 38 are reset due to the action of AND circuit 166; and this occurs at bit time B. The two inputs to the AND circuit 166 are satisfied from leads 184 and 84 having signals thereon at bit time B and from program change latch 92 respectively; and, under these conditions, a signal is supplied through lead 186, OR circuit 170, and lead 188 for resetting the latches 32, 34, 36, and 38. At bit time C, the program change latch 92 is reset by a "bit time C" signal in lead 190.

As has been above described, a change in program can be made immediately due to the action of AND circuit 108 when the system is in its first column condition. It is not desirable that a program change be made in the middle of a field, or that it be necessary to wait until the first column of a succeeding field, in view of the fact that the next field could, for example, be an auto field, such as an auto skip field. In this case, if a change in program could not be stored, the succeeding field would pass before the operator would have an opportunity to make a change in program. Therefore, the AND circuit 96, with its connections, has been provided so that the operator advantageously can depress one of the four program keys 22, 24, 26, and 28 in the middle of a field; and the effect of the depression will be stored by one of the program key latches 32, 34, 36 and 38 until the last column of the present field has been completed, at which time the signal "set first column latch" in lead 102 is present.

What we claim is:

1. A key-entry system including:
a keyboard having a plurality of data keys;
a data storage unit;
circuitry connecting said data keys and said storage unit so that, upon the actuation of a data key, data is transmitted to and stored in said unit, said unit being capable of carrying other data in the form of programs for modifying the entry of data into or the reading of data from said storage unit;
means for indicating the end of a field of data entered into said storage unit by actuation of said data keys;
manually operated program selection means;
circuitry under the control of said manually operated means for rendering one or another of said programs effective, said last-named circuitry including storage means for storing the effect of a change of said manually operated program selection means from one program to another program selecting condition and under the control of said end of field indicating means or delaying the application of the program change until the end of the field has been reached;
means for indicating the beginning of a field of data entered into said storage unit, said manually operated program selection means including a plurality of program keys; and
circuitry under the control of said keys and said beginning of field indicating means for rendering one or another of said programs immediately effective when a program key is actuated and the system is at the beginning of a field of data entered into said storage unit, said means for indicating the end of a field providing an electrical signal at the end of the field and said means for indicating the beginning of a field providing a signal at the beginning of the field, said circuitry including:
a program change latch for causing a change of program when set;

a logical OR circuit on the set side of said program change latch and having two inputs;
a program switch;
a logical AND circuit connected with both said end of field indicating means and said program switch and providing an output to said logical OR circuit so as to cause a change in program at the end of a field; and
another logical AND circuit connected with said beginning of field indicating means and also with said program switch and providing an output to said OR circuit for changing program at the beginning of a field.

2. A key-entry system including:
a keyboard having a plurality of data keys;
a data storage unit;
circuitry connecting said data keys and said storage unit so that, upon the actuation of a succession of data keys, data is transmitted to and stored in successive storage positions in said unit; said unit being capable of carrying other data in the form of programs for modifying the entry of data into or the reading of data from said storage unit;
means for providing an electrical signal by the filling of a certain number of successive storage positions in said storage unit due to actuation of a corresponding number of said data keys indicating the end of a field of data entered into said unit;
manually operated program selection means;
circuitry under the control of said manually operated means for rendering one or another of said programs effective and including storage means for storing the effect of a change of said manually operated program selection means from one program to another program selecting condition; and
means providing said electrical signal to said last-named circuitry so that the last-named circuitry remains ineffective while successive storage positions in said storage unit are filled by actuation of a succession of data keys until the end of the field is reached so that a program change is delayed until the end of the field.

3. A key-entry system as set forth in claim 2, said manually operated program selection means including a plurality of program keys, said circuitry under control of said manually operated means including a plurality of program key latches under the control of said program keys to thereby cause the setting of respective ones of said latches when the program keys are actuated.

4. A key-entry system as set forth in claim 3, said circuitry under the control of said manually operated means including also a program change latch connected with said program key latches to be set thereby and under the control of said electrical signal indicating the end of a field for delaying the setting of the program change latch and to thereby delay the application of the program change until the end of a field is reached.

5. A key-entry system as set forth in claim 4, said circuitry under the control of said manually operated means including also a logical AND circuit located electrically between said program key latches and said program change latch, said electrical signal indicating the end of a field being applied onto said AND circuit so as to set the program change latch when the end of a field is reached.

6. A key-entry system as set forth in claim 5, and including circuitry under the control of said data keys for providing a second electrical signal when any of the data keys is actuated, said second electrical signal being applied also onto said AND circuit so that the AND circuit is effective only when one of said data keys is actuated.

7. A key-entry system as set forth in claim 2, said data storage unit including means for providing an electrical signal for indicating the beginning of a field of data to be entered into said storage unit when the data keys are effectively connected through said first-named circuitry to enter data into the next successive storage position in said storage unit subsequent to said certain number of successive storage positions filled as aforesaid, said manually operated program selection means including a plurality of program keys, and circuitry under the control of said program keys and said last-named signal for rendering one or another of said programs immediately effective when a program key is actuated at the beginning of a field of data to be entered into the storage unit.

8. A key-entry system as set forth in claim 2, said storage unit being of a type wherein the various storage positions therein may contain end of field flags, said electrical signal providing means being responsive to said flags to indicate the end of the field of data entered into said storage unit.

9. A key-entry system as set forth in claim 8, said storage unit including a delay line connected in a loop with a shift register whereby information in the form of a series of characters may circulate through the delay line and the shift register, with each of the characters being capable of containing a flag indicating the end of a field.

10. A key-entry system as set forth in claim 8, said storage unit including a delay line connected in a loop with a shift register and capable of circulating a series of words each of which includes a series of characters, said manually operated program selection means including a plurality of program keys and said characters including a program character corresponding to each of said keys and each being capable of carrying an end of field flag or bit, and a clock for causing the end of field bit in each of the characters corresponding to a program key to be effective with respect to the particular program key for indicating the end of the field for the program corresponding to the particular program key.